United States Patent [19]

Hennenfent et al.

[11] 4,279,102

[45] Jul. 21, 1981

[54] METHOD OF MANUFACTURING NARROW TRACK FERRITE HEAD CORES

[75] Inventors: Douglas J. Hennenfent, Minneapolis; Robert A. Johnson, Minnetonka; Allan L. Holmstrand, Bloomington, all of Minn.

[73] Assignee: Magnetic Peripherals Inc., Minneapolis, Minn.

[21] Appl. No.: 927,325

[22] Filed: Jul. 24, 1978

[51] Int. Cl.³ ............................ B24B 1/00; G11B 5/42
[52] U.S. Cl. ........................................ 51/322; 29/603; 51/281 R; 360/122
[58] Field of Search .................. 29/603; 51/5 D, 267, 51/281 R, 322, 325; 360/122

[56] References Cited

U.S. PATENT DOCUMENTS

| | | | |
|---|---|---|---|
| 2,899,781 | 8/1959 | Williams | 51/267 |
| 3,269,381 | 8/1966 | Healy | 51/5 D |
| 3,593,414 | 7/1971 | Beun | 29/603 |
| 4,016,855 | 4/1977 | Mimata | 51/267 X |
| 4,017,965 | 4/1977 | Brutsch | 29/603 |

FOREIGN PATENT DOCUMENTS

| | | | |
|---|---|---|---|
| 425211 | 9/1974 | U.S.S.R. | 29/603 |
| 562850 | 8/1977 | U.S.S.R. | 29/603 |

Primary Examiner—Gary L. Smith
Attorney, Agent, or Firm—Edward L. Schwarz; Joseph A. Genovese

[57] ABSTRACT

A magnetic transducing core having a transducing face defined by planes whose surfaces comprise substantially parts of ferrite grains, and a method for producing this core. The method involves proper selection of the grit size and binder of a diamond grinding wheel, machining its sides to precise parallelism with each other, mounting it on a highly accurate air bearing, rotating it at high speed, and feeding a work piece ferrite bar from which the core is cut into the rotating wheel. These techniques prevent axial run-out between the edge of the cutting portion of the wheel and the work piece greater than 2.5 microns. A preferred embodiment includes a high pressure jet of coolant impinging on the wheel just ahead of the cutting interface.

3 Claims, 6 Drawing Figures

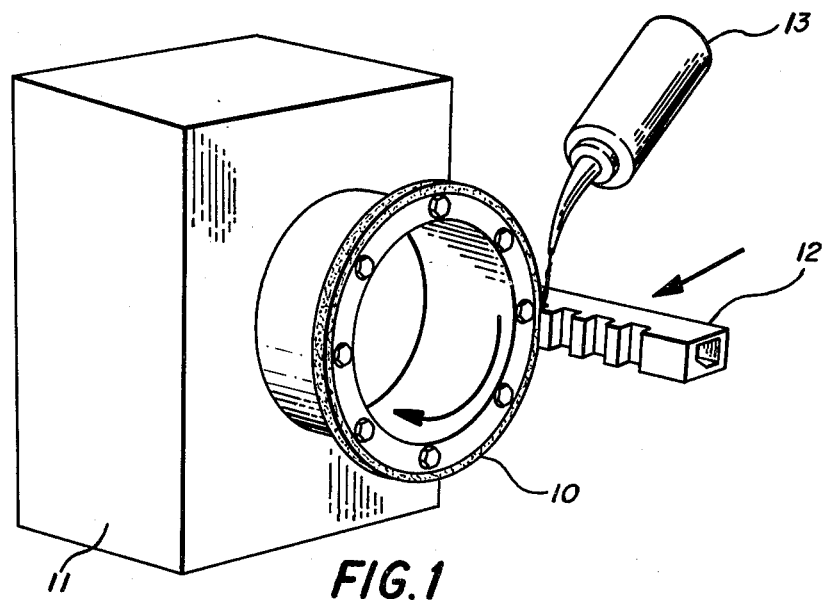
FIG.1
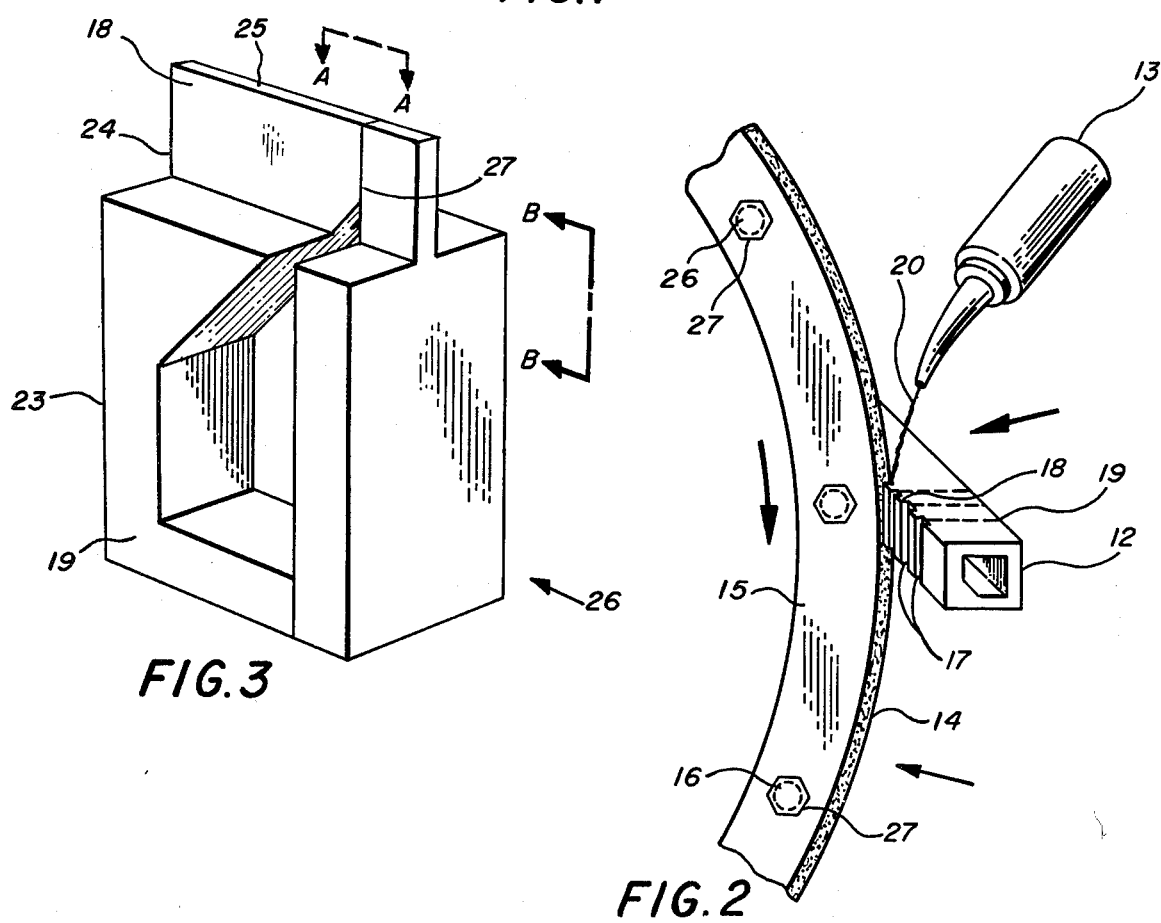
FIG.3
FIG.2

METHOD OF MANUFACTURING NARROW TRACK FERRITE HEAD CORES

BACKGROUND OF THE INVENTION

The transducing heads are one of the key elements of the modern disk-type data recording device. Briefly, such disk memories typically comprise a thin disk spun at high speeds, whose surfaces carry a recording medium, typically powdered iron oxide. Data is recorded on and read from the disk surfaces one track at a time by a movable recording head, which is suspended from an arm and which follows a generally radial (with respect to the disk) path while accessing one or another track. A common means of increasing the amount of data which a single disk surface can store is to reduce the track width, so that more tracks become available. This requires that the width of the transducing surface of the magnetic head be decreased. To a certain point, conventional manufacturing techniques and head core designs suffice in achieving this. Now, however, tracks are packed at nearly 400 per centimeter of radius, which requires that the width of the recording gap in the transducing surface be 0.025 mm. or less. Experience shows that if the entire core is machined to 0.025 mm., it usually saturates, limiting the linear bit density in each track. Further, such cores are extremely fragile.

The solution is to make the transducing face of the head core relatively narrow as compared to the thickness of the body of the core. Our experimentation has further shown that simply beveling the core on one or both sides to form the narrowed face is not satisfactory because fringing occurs during use of such a core, causing track width to be greater than transducing face width and unduly dependent upon spacing of the face from the recording medium. The solution is to make the transducing core with a relatively narrow projection having substantially parallel sides which define the transducing face, and a relatively thicker portion integral with the projection which provides the magnetic circuit path.

Another factor which we have found important is the problem of achieving repeatability of transducing face width. If the width of the face varies with respect to its length, as in currently produced cores, it is difficult to accurately control the width of the transducing gap, and the result is that a relatively large number of cores will be rejected because they are too narrow or too wide. Our investigation has shown that this problem is caused by inability of current machining methods to grind away parts of individual ferrite grains which form these cores without exceeding the inter-grain binding forces. If the machining process causes these forces to be exceeded, then whole grains will be dislodged. Since the size of individual grains is a significant fraction of the width of the transducing face, dislodging of entire grains rather than partial abrasion of them produces significant deviations in face width. Furthermore, because of the fringing problem, the surfaces defining the width of the transducing face must extend substantially past the depth, or throat apex, of the flux gap. Removal of substantial numbers of ferrite grains in toto from these surfaces will weaken the projection which they define so that it can easily break off during the final portions of the machining operation or during later assembly operations. Furthermore, removal of these grains in the critical areas adjacent the gap may adversely affect the reluctance of the core.

BRIEF DESCRIPTION OF THE INVENTION

We have found that a proper selection of grinding wheel grit size and matrix and drastic limitations on total run-out in the axial and radial directions of the wheel relative the core surfaces being cut allows most individual grains to be partially abraded and relatively few grains dislodged from the surface being formed. Use of a coolant formed of water containing dissolved wetting agent substantially extends wheel life when jet sprayed onto the annular or exterior face of the wheel just upstream of the cutting interface.

Accordingly, one purpose of this invention is to produce magnetic transducing cores having very narrow transducing faces.

A second purpose is to mass produce such cores with very little variation from core to core, of the flux gap width in the transducing face.

Still another purpose is to produce such narrow-face cores with a relatively large cross-section of magnetic material area in the flux path.

Still another purpose in the furtherance of the preceding purposes is to produce cores whose transducing faces are defined by surfaces substantially perpendicular thereto and which comprise substantially ferrite grain faces formed by abrasively removing parts of individual grains.

Still another purpose of the invention is to produce a magnetic core having a face carried on a projection whose sides which are intersected by the flux gap are nearly parallel. This allows regulation of gap depth independent of gap width.

Still another purpose is to provide a transducing core having its transducing face carried on a perpendicular-sided projection to eliminate magnetic fringing.

Other objects and advantages of this invention will become apparent in the following descriptions.

BRIEF DESCRIPTION OF THE DRAWINGS

FIG. 1 is a perspective sketch of a typical manufacturing setup for producing these cores.

FIG. 2 is a detailed perspective of the cutting interface between the wheel and the ferrite bar from which the individual cores are cut.

FIG. 3 is a perspective view of a typical finished core.

DESCRIPTION OF THE PREFERRED EMBODIMENTS

Figure 4:
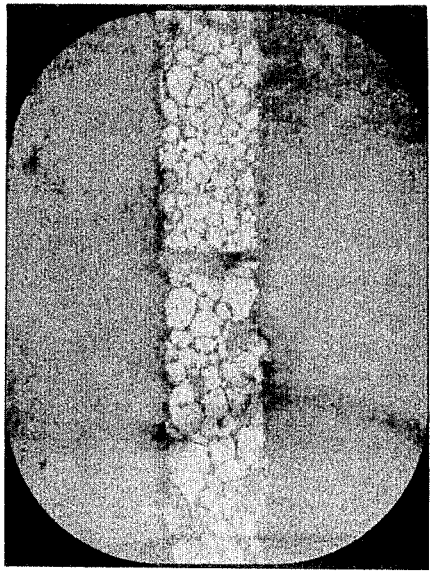
FIG. 4 is a 600 X photomicrograph taken as a view A—A (FIG. 3) of an actual transducing surface adjacent the flux gap, of a core produced by manufacturing techniques which have preceded that of this invention. In this figure and in FIGS. 5 and 6, the surfaces have been etched to reveal the individual ferrite grain boundaries.

Ferrite head core 26 (FIG. 3) which is the article of manufacture forming the subject of this patent application is made by a manufacturing technique which has several critical elements or steps, this technique itself being a part of the subject matter of this invention. FIG. 1 shows the important elements of the manufacturing technique itself. Cutting wheel 10 is mounted for rotation on air bearing assembly 11. Workpiece 12 is an elongated ferrite bar having a lengthwise bore defining the inner surface of the magnetic flux paths of cores 26 not shown formed from bar 12. Bar 12 is supported by a chuck (no part of this invention) which steps lengthwise and feeds bar 12 into wheel 10 at a speed of around 5 cm./min. to form a series of side-by-side kerfs or slots 17 (FIG. 2). The material remaining between adjacent kerfs 17 forms the projection 24 which carries the transducing face 25 of the completed core 26 (FIG. 3). After kerfs 17 have been cut in bar 12, the bar is cut transversely along planes 19 intersecting the middle of the kerfs 17 (FIG. 2) to form the individual cores 26.

Ferrite is a hard refractory material and hence the cutting area of cutting wheel 10 is almost invariably formed of diamond grit carried in a softer matrix of some kind. We have discovered that with proper selection of grit and matrix and by exercising great pains in forming a wheel 10 that runs with a very small amount of radial and axial run-out at its periphery, cores 26 can be formed with surfaces 18 which substantially comprise the faces formed by partial abrading of individual ferrite grains. This requires that friction and impact between wheel 10 and bar 12 be kept sufficiently low to allow abrading of individual ferrite grains with substantially no dislodging of individual ferrite grains adjacent the sides of wheel 10 while bar 12 is being fed into it. To accomplish this, we have found one important consideration to be selection of a proper wheel 10. A preferred wheel, manufactured by Universal Grinding Wheel Co., Salem, IL. has the trade name Univel, has grit size no larger than 2,000 (9–10 microns) and has grit concentration of 100. The Univel wheel has a polyamide matrix. It is believed that the dynamic friction between individual ferrite grains and such a matrix is sufficiently low that frictional forces will not dislodge individual ferrite grains adjacent the side of wheel 10. A second wheel which can be used is made by Cutwell Diamond Products Co., Saddle Brook, N.J. and is denominated the type J. It has a polyester matrix with a chromium oxide lubricant, and the same grit specifications as the Univel wheel. It appears the chromium oxide lubricant reduces friction between wheel 10 and the ferrite sufficiently to again prevent dislodging individual ferrite grains at the side of wheel 10. A typical wheel 10 can be 0.5 to 1 mm. thick and 15 cm. in diameter. The abrasive is in an annular ring 14 about 8 to 10 mm. deep around wheel 10's periphery. Wheel 10 is specified to have a metal hub 15 carrying the ring of abrasive.

To achieve partial abrading of ferrite grains without dislodging them, it is necessary to prepare wheel 10 very carefully so that when mounted on bearing 11, maximum axial and radial run-outs are no greater than 0.0025 mm. Because wheel 10 as it comes from the manufacturer is very flexible and fragile, as well as lacking surface accuracy needed for this operation, its sides must be machined to better than 0.0025 mm. parallelism before being mounted in a rigid support assembly to prevent its distortion. The preferred assembly which supports wheel 10 is described in our copending application entitled *Precision Grinding Wheel Mount and Method of Aligning*, having common inventorship, filing date and assignee with this application. Fasteners 27 are shown passing through holes 26 and attaching wheel 10 to such a support assembly. The support assembly run-out tolerance plus wheel 10's tolerance must be less than the 0.0025 mm. totals run-out permitted. The 0.0025 mm. total axial run-out specified is only nominal, and is a function of many factors whose change may allow increased or require decreased run-out. Another important factor is to accurately balance the wheel support assembly to prevent additional axial run-out and allow dressing to the needed radial run-out.

Radial run-out must also be limited to 0.0025 mm. When a new wheel is freshly mounted on bearing 11, it is dressed against a dressing stone in the usual manner to the required 0.0025 mm. or less radial run-out. Initial radial run-out of greater than 0.005 mm. is not preferred since at the 35 m./sec. or greater rim speed of wheel 10, dynamic balance will be affected during dressing requiring rebalancing and additional dressing.

During the actual cutting operation, rim speed of wheel 10 can be anywhere from 35–75 m./sec., with centripetal failure of wheel 10 limiting top speed. At the high surface speed of wheel 10, it is necessary to provide cutting fluid to cool wheel 10 and ferrite bar 12. It is preferred that a relatively high pressure jet 20 of cutting fluid be formed by nozzle 13 and directed onto the exterior surface of wheel 10 just upstream or ahead of the cutting interface. Pressure for the cutting fluid should be around 4 kg./sq. cm. or greater. This pressure produces a great enough fluid jet 20 velocity to pierce the boundary layer of air adjacent the surface of wheel 10. Coolant can also be dripped onto the interface, but life of the wheel is reduced by a factor of 80% or so as opposed to the jet application. Because of the precise, expensive preparation needed for each wheel 10, it is much preferred that jet cooling be used.

Although no mechanical support for bar 12 is shown, those skilled in the art will understand that many different mechanisms for supporting and advancing bar 12 are possible. One which we have found particularly convenient employs a round, carousel-type mounting cylinder about whose periphery are attached a plurality of bars 12. The cylinder is slowly rotated causing kerfs 17 to be cut into successive bars around the periphery. At the end of one such revolution of the cylinder, it is stepped or indexed axially and another set of kerfs 17 are cut adjacent the first set. This process continues until all the bars have been properly cut. They then can be removed and sliced along planes 19 by conventional methods.

Figure 6:
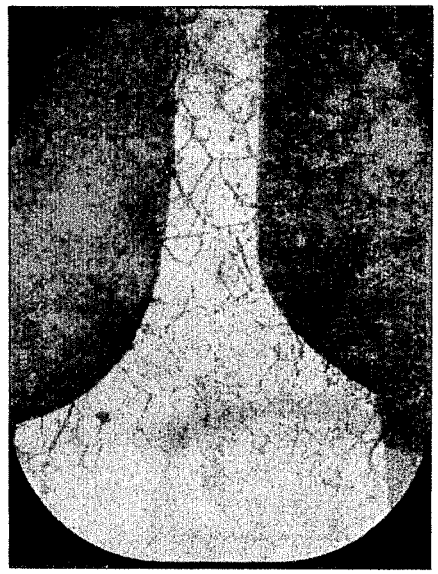
FIG. 6 is a 600 X photomicrograph of an end view taken as a view B—B of a core forming the subject matter of this invention and produced to the teachings of this invention.
Figure 5:
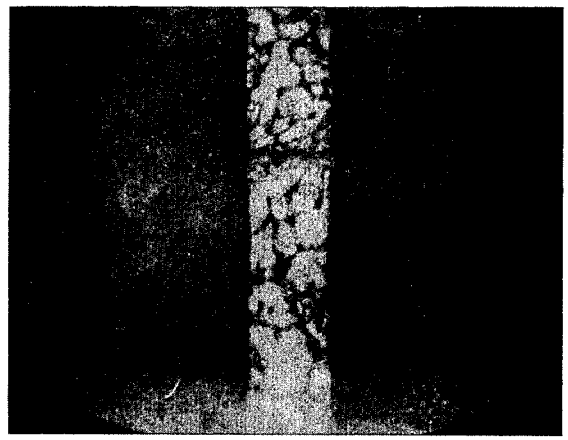
FIG. 5 is a 600 X photomicrograph of a view similar to that in FIG. 4, but of a transducing face of a core produced according to the teachings of this invention and typical of the cores forming the subject matter of this invention.

The photographs forming FIGS. 4–6 demonstrate more clearly than words could ever, the important advantages which this invention provides. Prior to the taking of these photographs, the surfaces of the cores they display had been etched to create dark lines defining the boundaries of the grains. FIG. 4 is a view A—A, as shown in FIG. 3, of the transducing face 25 of a core 26 which has been machined according to conventional methods. Note how individual grains appear to be dislodged in toto rather than partially abraded. Dislodging of grains in toto produces the vermiculate lines representing faces 18 (FIG. 3) on edge. The width of face 25 is not constant along its length, meaning that the width of flux gap 27 cannot be accurately controlled.

Turning next to FIG. 5, the same view A—A is shown of a core 26 prepared by our method. Note how portions of grains which extended past planes 18 defining the transducing face have been smoothly cut away from the remainders of the grains, which are still firmly imbedded in the material.

FIG. 6 discloses the very same core shown in FIG. 5, but in view B—B which is an end view of projection 24, including the portion of the bottom of the two slots cut by wheel 10 in defining projection 24. Note again that individual grains appear to be smoothly sliced or partially abraded rather than being dislodged in toto from the projection. The differences in smoothness of surfaces 18 between FIG. 4, and FIGS. 5 and 6 appears, according to our observations, to be totally dependent on whether the new method herein disclosed is used to form them or not.

The rough characteristic of surfaces 18, as shown in FIG. 4, is undesirable not only because it affects the width of flux gap 27, but it also makes projection 24 more liable to break during later assembly. Breakage also is reduced during cutting of kerfs 17, because the reduced run-out and lower wheel-to-ferrite friction reduces mechanical stresses on the relatively narrow and fragile projection 24.

What is claimed is:

1. A method of forming the opposite sides of a projection of a magnetic transducing core formed of ferrite grains, said projection having a transducing surface at its end which a flux gap intersects, said flux gap splitting the projection and intersecting said opposing sides, and said opposing sides comprising substantially surfaces formed by abrasively removing parts of individual ferrite grains, comprising the steps of:

(a) mounting on a precision spindle, a diamond dust grinding wheel having diamond grit no coarser than 2,000 size, and having a polymer matrix, said spindle-mounted grinding wheel having axial peripheral runout of less than about 0.0025 mm. per side and radial runout of less than about 0.0025 mm. when rotated at a peripheral speed of about 35 meters per second;
   (b) rotating the wheel at a peripheral speed of at least about 35 meters per second;
   (c) feeding a ferrite bar into the rotating wheel at a speed of about 5 cm. per minute or less along a path substantially parallel to the sides of the wheel; and
   (d) applying a fluid coolant comprising water containing a wetting agent to the wheel adjacent the cutting interface, whereby friction and impact between the wheel and the bar are kept sufficiently low to allow abrading of individual ferrite grains with substantially no dislodging of individual ferrite grains adjacent the sides of the wheel during the ferrite bar feeding step.

2. The method of claim 1 wherein the coolant applying step further comprises spraying the coolant onto the wheel immediately upstream of the bar through a nozzle, with pressure of approximately 4 kg/sq.cm.

3. The method of claim 1, further comprising machining the wheel sides to be parallel to 0.0025 mm. or less prior to mounting on the spindle.

* * * * *